Feb. 16, 1932.    E. KRULL    1,845,923
SCREW DRIVER
Filed July 24, 1930
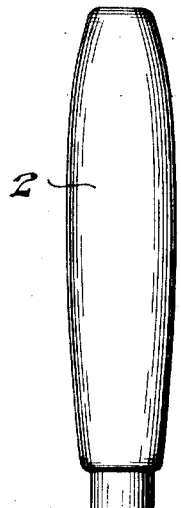
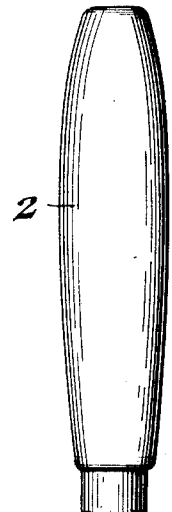
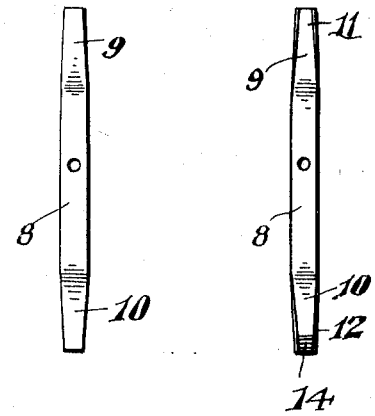
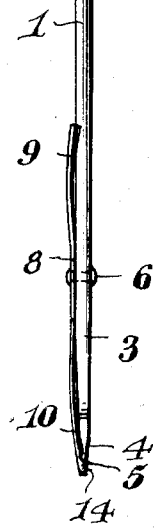
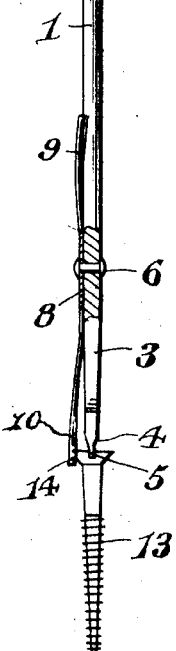
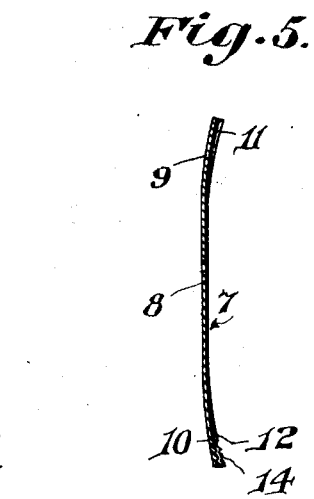
INVENTOR.
Eric Krull,
BY Geo. P. Kimmel
ATTORNEY.

Patented Feb. 16, 1932

1,845,923

UNITED STATES PATENT OFFICE

ERIC KRULL, OF COLUMBUS, GEORGIA

SCREW DRIVER

Application filed July 24, 1930. Serial No. 470,453.

This invention relates to a screw driver and has for its primary object to provide, in a manner as hereinafter set forth, a screw driver including a screw retaining element for retaining a screw in position with respect to the screw driver during the driving or removing of the screw.

A further object of the invention is to provide a screw driver including a screw retaining element as aforesaid, in which such element is provided with means for positively engaging the head of a screw.

With the foregoing and other objects in view, the invention consists of the novel construction, combination and arrangement of parts as hereinafter more specifically described, and as illustrated in the accompanying drawings wherein is shown an embodiment of the invention, but it is to be understood that the description and drawings are to be taken as illustrative and that the invention is to be limited only by the scope of the claims hereunto appended.

In the accompanying drawings in which like numerals are employed to designate like parts throughout the several views:

Figure 1 is an elevation of a screw driver in accordance with this invention.

Figure 2 is a similar view, partly in section, showing the screw driver applied to a screw.

Figure 3 is a detail view showing in elevation the outer face of the screw retaining element.

Figure 4 is a similar view showing the inner face of the screw retaining element.

Figure 5 is a longitudinal section through the screw retaining element.

Referring to the drawings in detail, the numeral 1 indicates the shank of my improved screw driver, such shank being provided at one end with a handle member 2. In spaced relation to the opposite end of the shank the latter is tapered as indicated at 3, such tapered portion merging into a further tapered portion 4 which terminates in a screw head engaging portion 5 of rectangular cross section and having parallel sides.

Pivotally connected to the shank 1 by means of a suitable pivot pin 6 is a screw retaining element indicated generally by the numeral 7. The element 7 includes a flat central portion 8 through which the pivot pin 6 extends, such central portion 8 merging at its end into arcuate end portions 9 and 10. The inner faces of the arcuate end portions 9 and 10 are transversely concave as indicated at 11 and 12 respectively. The element 7 is of such length that when the same is disposed in parallel relation to the shank 1, the arcuate end portion 10 projects slightly beyond the screw engaging portion 5 of the shank. The concaved inner face 12 is adapted to embrace the head of a screw, such as 13, such concaved face 12 being provided with transversely extending ribs 14 for positively engaging the upper edge of the screw head. The element 7 is formed of resilient material so that an inward force will be exerted on the arcuate end portion 10 when the latter is in engagement with a screw which is also engaged by the screw engaging portion 5 of the shank. The concaved face 11 of the arcuate portion 9 receives a peripheral portion of the shank 1 therein in order to prevent pivotal movement of the screw retaining element when the same is in operative position with respect to the screw. The concavity of the face 11 conforms identically with the convexity of the peripheral face of the shank 1.

In the use of the screw driver, the element 7 is positioned at an inclination to the longitudinal plane of the shank 1, after which the portion 5 of the shank is engaged with a screw and the element 7 is swung upon its pivot into parallel relation with the shank 1 whereby the head of the screw will be embraced by the concaved face 12 of the arcuate end portion 10 with the upper edge of the screw head engaged between a pair of adjacent ribs 14 on the concaved face 12. The screw then may be driven home until the end of the arcuate portion 10 is brought into engagement with the object into which the screw is being driven, after which the element 7 is again swung to an inclination to the longitudinal plane of the shank 1 to enable the head of the screw to be buried against the object into which the screw is being driven. In removing a screw, the latter is turned two or three revolutions without the aid of the element 7 in order to slightly space the head of the screw from the object into which the screw extends, after which the element 7 is swung about its pivot into parallel relation with the shank 1 in order to engage the head of the screw with the concaved face 12 of the arcuate end portion 10. If desired, the end portions 9 and 10 may be reversed with respect to the shank in order that the screw driver may be used in the ordinary manner. Obviously, when the end portions are so reversed, the element 7 will be maintained in parallel relation to the shank by the end portion 10, and the end portion 9 will be disposed inwardly of the screw engaging end of the shank.

It is thought that the many advantages of a screw driver in accordance with this invention will be readily apparent, and although the preferred embodiment of the invention is as illustrated and described, it is to be understood that changes in the size, shape and arrangement of parts may be resorted to, so long as such changes fall within the scope of the invention as defined in the appended claims.

What I claim is:

1. A screw driver comprising, a shank having a screw engaging portion, and a resilient screw retaining element pivoted to the shank, said retaining element having transversely and longitudinally arcuate end portions, one of which engages the shank and the other of which projects beyond the screw engaging portion of the shank for engaging a screw, such projected end portion of the retaining element having a plurality of ribs for positive engagement with the periphery of a screw head.

2. A screw driver comprising, a shank having a screw engaging portion, and a resilient screw retaining element pivoted to the shank, said retaining element having arcuate end portions, one of which engages the shank and the other of which is of greater length than the one engaging the shank and projects beyond the screw engaging portion of the shank for engaging a screw, such projected end portion of the retaining element having a plurality of ribs for positive engagement with the periphery of a screw head, said arcuate end portions having transversely concaved inner faces, said retaining element being reversible on the shank to position the same in parallel relation to the shank with all parts of the retaining element located inwardly of the screw engaging portion of the shank, the end portion of the retaining element of greater length operating to maintain the retaining element in its reversed position.

3. A screw driver comprising, a shank having a screw engaging portion, and a resilient screw retaining element having a flat central portion pivoted to the shank, said flat central portion merging at its ends into inwardly curved end portions having their inner longitudinal faces concaved transversely thereof, one of said concaved faces engaging the shank and the other of the concaved faces projecting beyond the screw engaging portion of the shank for engaging a screw.

4. A screw driver comprising, a shank having a tapered portion merging into a screw engaging portion of rectangular cross section and having parallel sides, and a resilient screw retaining element having a flat central portion pivoted to the shank, said flat central portion merging into inwardly arched end portions, one of which is formed with a transversely concaved inner face for receiving therein a peripheral portion of the shank, the other arched end portion projecting beyond the screw engaging portion of the shank and having a transversely concaved inner face for embracing a screw head, said concaved face for embracing a screw head being provided with a series of transversely extending ribs.

5. A screw driver comprising, a shank having a screw engaging end portion, and a resilient elongated screw retaining element having a flat centrally disposed portion pivoted to the shank at a point between the transverse median and one end of said element, said element further having inwardly curved end portions having their inner longitudinal faces concaved transversely thereof, said element normally extending lengthwise of the shank with one of said inwardly curved, transversely concaved end portions embracing a peripheral portion of the shank to maintain said element lengthwise of the shank and with the other of said inwardly curved, transversely concaved end portions projecting beyond the screw engaging end portion of the shank, said element being movable about its pivot to a reversed position with the end portion which formerly projected beyond the screw engaging end portion of the shank embracing a peripheral portion of the shank to maintain said element lengthwise of the shank with the entire element located inwardly of the screw engaging end portion of the shank.

In testimony wherof, I affix my signature hereto.

ERIC KRULL.